US009628197B2

(12) United States Patent
Takeda et al.

(10) Patent No.: US 9,628,197 B2
(45) Date of Patent: Apr. 18, 2017

(54) INTERFERENCE REDUCTION METHOD, RADIO BASE STATION, USER TERMINAL AND RADIO COMMUNICATION SYSTEM

(71) Applicant: NTT DOCOMO, INC., Tokyo (JP)

(72) Inventors: Kazuaki Takeda, Tokyo (JP); Satoshi Nagata, Tokyo (JP); Nobuhiko Miki, Tokyo (JP)

(73) Assignee: NTT DOCOMO, INC., Tokyo (JP)

(*) Notice: Subject to any disclaimer, the term of this patent is extended or adjusted under 35 U.S.C. 154(b) by 22 days.

(21) Appl. No.: 14/419,533

(22) PCT Filed: Jul. 8, 2013

(86) PCT No.: PCT/JP2013/068655
§ 371 (c)(1),
(2) Date: Feb. 4, 2015

(87) PCT Pub. No.: WO2014/024615
PCT Pub. Date: Feb. 13, 2014

(65) Prior Publication Data
US 2015/0229413 A1 Aug. 13, 2015

(30) Foreign Application Priority Data
Aug. 7, 2012 (JP) .................................. 2012-175148

(51) Int. Cl.
*H04B 15/00* (2006.01)
*H04W 72/08* (2009.01)
(Continued)

(52) U.S. Cl.
CPC ........... *H04B 15/00* (2013.01); *H04L 5/0053* (2013.01); *H04L 5/0073* (2013.01);
(Continued)

(58) Field of Classification Search
CPC .... H04B 15/00; H04W 72/042; H04W 16/06; H04W 16/32; H04W 48/12;
(Continued)

(56) References Cited

U.S. PATENT DOCUMENTS

2012/0258724 A1* 10/2012 Kim .................... H04W 72/082
455/452.2
2012/0276895 A1* 11/2012 Choi .................. H04W 52/0235
455/422.1

FOREIGN PATENT DOCUMENTS

DE    WO 2011162159 A1 * 12/2011 .......... H04W 72/082
EP    2439984 A1    4/2012
(Continued)

OTHER PUBLICATIONS

Apple Inc., "Scrambling Sequences for Enhanced PDCCH", 3GPP TSG RAN WG1 Meeting #68, R1-120272, Dresden, Germany, Feb. 6-10, 2012.*
(Continued)

*Primary Examiner* — Pao Sinkantarakorn
*Assistant Examiner* — Kabir Jahangir
(74) *Attorney, Agent, or Firm* — Osha Liang LLP

(57) ABSTRACT

A method to reduce interference between a macro cell and a small cell in a radio communication system in which the macro cell and the small cell are allocated to overlap at least in part is disclosed. The interference reduction method includes the steps in which a small base station transmits macro cell identification information that identifies the macro cell, to a user terminal in a small cell, allocates a downlink control signal for the user terminal to a radio resource unit having a different index number from that of a radio resource unit where a downlink control signal to be transmitted from the macro base station is allocated, and interleaves the downlink control signal for the user terminal using an interleaving pattern that is generated based on the
(Continued)

macro cell identification information and that is the same as an interleaving pattern used in macro base station.

9 Claims, 11 Drawing Sheets

(51) Int. Cl.
| | |
|---|---|
| *H04W 72/04* | (2009.01) |
| *H04W 84/04* | (2009.01) |
| *H04W 88/08* | (2009.01) |
| *H04W 48/12* | (2009.01) |
| *H04L 1/18* | (2006.01) |
| *H04L 5/00* | (2006.01) |
| *H04W 16/32* | (2009.01) |

(52) U.S. Cl.
CPC ......... *H04W 72/042* (2013.01); *H04L 1/1867* (2013.01); *H04L 5/0048* (2013.01); *H04W 16/32* (2013.01); *H04W 48/12* (2013.01); *H04W 72/04* (2013.01); *H04W 72/082* (2013.01); *H04W 84/045* (2013.01); *H04W 88/08* (2013.01)

(58) Field of Classification Search
CPC ... H04W 84/045; H04W 88/08; H04W 72/04; H04W 72/082; H04L 5/0073; H04L 5/0053; H04L 5/0048; H04L 1/1867
See application file for complete search history.

(56) References Cited

FOREIGN PATENT DOCUMENTS

| | | | |
|---|---|---|---|
| JP | WO 2011129448 A1 * | 10/2011 | ............ H04W 16/32 |
| JP | 2012-005080 A | 1/2012 | |
| WO | 2012/045584 A1 | 4/2012 | |

OTHER PUBLICATIONS

International Search Report for corresponding International Application No. PCT/JP2013/068655, mailed Sep. 17, 2013 (2 pages).
3GPP TR 25.913 V8.0.0; "3rd Generation Partnership Project; Technical Specification Group Radio Access Network; Requirements for Evolved UTRA (E-UTRA) and Evolved UTRAN (E-UTRAN) (Release 8);" Dec. 2008 (18 pages).
Notification of Reasons for Rejection issued in corresponding Japanese Application No. 2012-175148, mailed on May 10, 2016 (6 pages).
Extended European Search Report issued in corresponding European Application No. 13828535.8, mailed on Feb. 25, 2016 (10 pages).

* cited by examiner

INTERFERENCE REDUCTION METHOD, RADIO BASE STATION, USER TERMINAL AND RADIO COMMUNICATION SYSTEM

TECHNICAL FIELD

The present invention relates to an interference reduction method, a radio base station, a user terminal and a radio communication system in a next-generation mobile communication system in which a macro cell and a to small cell overlap at least in part.

BACKGROUND ART

In a UMTS (Universal Mobile Telecommunications System) network, long-term evolution (LTE) is under study for the purposes of further increasing high-speed data rates, providing low delay, and so on (non-patent literature 1). In LTE, as multiple access schemes, a scheme that is based on OFDMA (Orthogonal Frequency Division Multiple Access) is used in downlink channels (downlink), and a scheme that is based on SC-FDMA (Single Carrier Frequency Division Multiple Access) is used in uplink channels (uplink).

Also, successor systems of LTE (referred to as, for example, "LTE-advanced" or "LTE enhancement" (hereinafter referred to as "LTE-A")) are under study for the purpose of achieving further broadbandization and increased speed beyond LTE. In an LTE-A system, a Het Net (Heterogeneous Network), in which a small cell (for example, a pico cell, a femto cell and so on) having a local coverage area of a radius of approximately several tens of meters is formed in a macro cell having a wide coverage area of a radius of approximately several kilometers, is under study (for example, non-patent literature 1).

CITATION LIST

Non-Patent Literature

Non-Patent Literature 1: 3GPP TR 25.913 "Requirements for Evolved UTRA and Evolved UTRAN"

SUMMARY OF INVENTION

Technical Problem

The above-described HetNet is a radio communication system in which a macro cell and a small cell are arranged to overlap geographically at least in part. Consequently, to reduce interference between the macro cell and the small cell, it is desirable to perform interference coordination (eICIC: enhanced Inter-Cell Interference Coordination).

The present invention has been made in view of the above, and it is therefore an object of the present invention to provide an interference reduction method, a radio base station, a user terminal and a radio communication system that can reduce interference between a macro cell and a small cell in a radio communication system in which a macro cell and a small cell are arranged to overlap at least in part, such as a HetNet.

Solution to Problem

The interference reduction method of the present invention is an interference reduction method in a small base station that forms a small cell so that at least part of the small cell overlaps with a macro cell that is formed by a macro base station, and this interference reduction method includes the steps of transmitting macro cell identification information that identifies the macro cell, to a user terminal in the small cell, allocating a downlink control signal for the user terminal to a radio resource unit having a different index number from that of a radio resource unit where a downlink control signal to be transmitted from the macro base station is allocated, and interleaving the downlink control signal for the user terminal using an interleaving pattern that is generated based on the macro cell identification information and that is same as an interleaving pattern used in the macro base station.

Advantageous Effects of Invention

According to the present invention, in a communication system in which a macro cell and a small cell are arranged to overlap at least in part, as in a HetNet, it is possible to reduce interference between the macro cell and the small cell.

DESCRIPTION OF EMBODIMENTS

Figure 1:
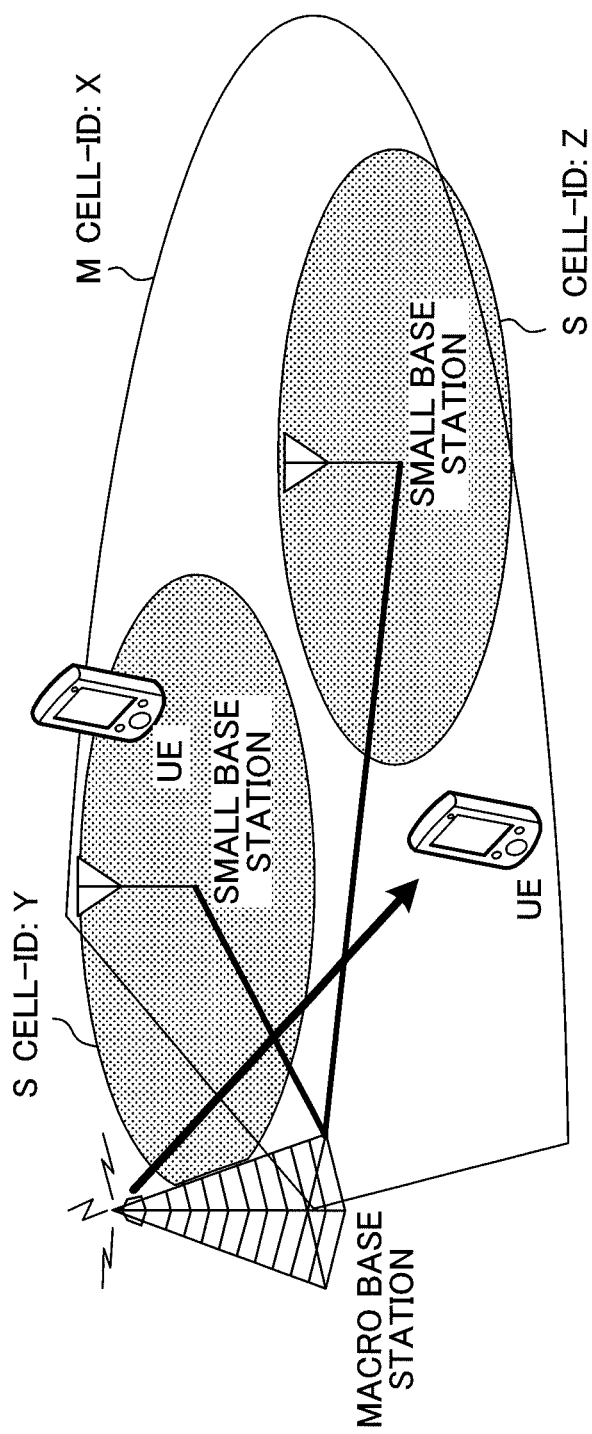
FIG. 1 is a conceptual diagram of a HetNet.

FIG. 1 is a conceptual diagram of a HetNet. As shown in FIG. 1, the HetNet includes a radio base station that forms a macro cell M (hereinafter referred to as a "macro base station"), radio base stations that form each small cell S (hereinafter referred to as "small base stations"), and user terminals (UE: User Equipment) that are connected to the macro base station or the small base stations. Note that the macro base station may be referred to as an "eNodeB (eNB)," a "macro eNB (MeNB)," a "transmission point" and so on. Also, the small base stations may be referred to as "pico eNBs," "femto eNBs," "transmission points" and so on.

The macro cell M is a cell having relatively wide coverage (for example, a radius of approximately 10 km), and may be referred to as a "wide area" and so on, and may be a sector.

Also, the small cells S are cells having local coverage (for example, a radius of approximately several meters), and may be referred to as "local areas," "pico cells," "nano cells," "femto cells," "micro cells," "eLA (enhanced Local Area) cells" and so on.

In the HetNet, as shown in FIG. 1, the macro base station and each small base station are arranged so that the macro cell M and each small cell S overlap geographically at least in part. Although the macro base station and each small base station are connected through, for example, a wired link such as an X2 interface, they may be connected through a radio link as well.

Also, in the HetNet, cell IDs to identify the macro cell M (macro base station) and the small cells S (small base stations), individually, are used. In FIG. 1, the macro cell M is identified by the cell ID "X," and the two small cells S are identified by "Y" or "Z," individually.

In a HetNet like this, an overlapping frequency regions are used between a macro cell M and small cells S. Consequently, a study is in progress to reduce interference (especially, interference between downlink signals) between the macro cell M and the small cells S by performing interference coordination (eICIC).

Here, the downlink signals include downlink data signals (for example, a physical downlink shared channel (PDSCH) signal) in which user data and higher layer control information are transmitted, and downlink control signals (for example, a physical downlink control channel (PDCCH) signal, a physical hybrid-ARQ indicator channel (PHICH) signal, and a physical control format indicator channel (PCFICH) signal) in which control information is transmitted.

For interference coordination between downlink data signals, it may be possible to prevent the use of overlapping radio resource regions between a macro cell M and a small cell S by using a time-domain approach and a frequency-domain approach.

To be more specific, in the time-domain approach, in a time region (for example, a subframe) in which the PDSCH signal is allocated in either one of the macro cell M and the small cell S, a muting subframe is applied in the other cell. The muting subframe means a subframe where the PDSCH signal is not allocated, and is, for example, an almost blank subframe (ABS).

Figure 2:
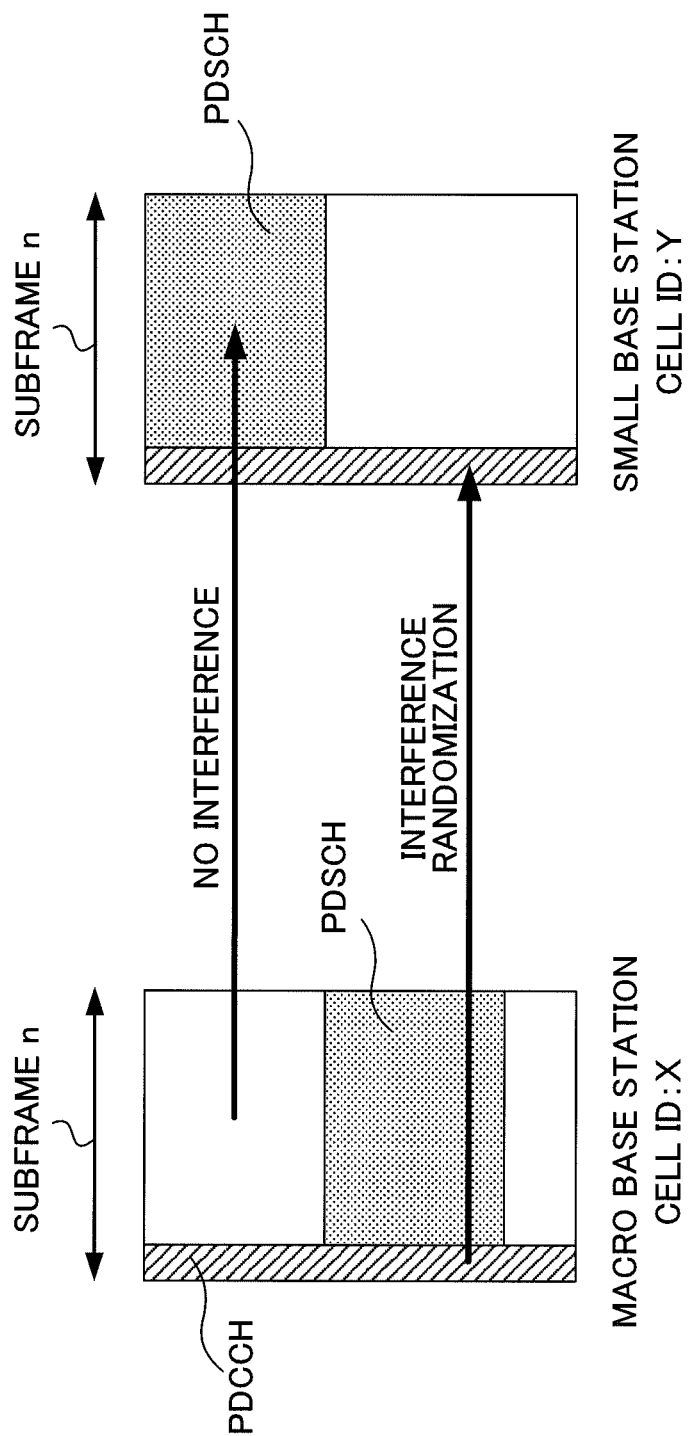
FIG. 2 is a diagram to show an example of interference coordination in a HetNet.

Also, in the frequency-domain approach, as shown in FIG. 2, in a frequency region (for example, a physical resource block (PRB)) in which the PDSCH signal is allocated in either one of the macro cell M and the small cell S, the PDSCH signal is not allocated in the other cell.

Meanwhile, for interference coordination between downlink control signals, it may be possible to randomize interference by using different scrambling sequences and interleaving patterns between the macro cell M and the small cell S. Note that, as will be described later, the interleaving patterns may include shift patterns to be used in cyclic shifts, frequency offset values and so on.

To be more specific, as shown in FIG. 2, the PDCCH signal in the macro cell M and the PDCCH signal in the small cell S are arranged in overlapping radio resource regions (maximum three OFDM symbols from the subframe top over the entire system band). In this case, scrambling is conducted using scrambling sequences that are each specific (cell-specific) to the macro cell M and the small cell S. Similarly, cyclic shifts are applied using cell-specific shift patterns. By this means, it is possible to randomize interference that is produced between the PDCCH signals of the macro cell M and the small cell S.

Here, the cell-specific scrambling sequences are, for example, determined based on equation 1. Also, the cell-specific shift patterns are, for example, determined based on equation 2.

$$c_{init} = \lfloor n_s/2 \rfloor 2^9 + N_{ID}^{cell} \quad \text{[equation 1]}$$

$$\overline{w}^{(p)}(i) = w^{(p)}((i+N_{ID}^{cell}) \bmod M_{quad}) \quad \text{[equation 2]}$$

In equations 1 and 2,
$N_{ID}^{cell}$
is the cell ID, which varies per cell. Cell-specific scrambling sequences and shift patterns are generated based on this cell ID. By this means, different scrambling sequences and shift patterns are used between the macro cell M and the small cell S, so that interference between the PDCCHs of the macro cell M and the small cell S can be randomized (equalized).

Similarly, as for other downlink control signals such as the PCFICH signal and the PHICH signal, interference can be randomized (equalized) using cell-specific scrambling sequences and interleaving patterns (including frequency offset values and so on).

As described above, interference between downlink control signals in the macro cell M and the small cell S is randomized (equalized) using cell-specific scrambling sequences and interleaving patterns (including shift patterns and frequency offset values). However, there is a threat that interference between downlink control signals in the macro cell M and the small cell S cannot be reduced sufficiently by interference randomization. So, the present inventors have studied an interference reduction method that can reduce interference between downlink control signals in the macro cell M and the small cell S more reliably, and arrived at the present invention.

With the interference reduction method according to the present invention, the small base station transmits macro cell identification information to identify the macro cell M, to a user terminal in the small cell S. Also, the small base station allocates downlink control signals for the user terminal to radio resource units having different index numbers from those of radio resource units, to which downlink control signals transmitted from the macro base station are allocated. Also, the small base station interleaves the downlink control signals for the user terminal using interleaving patterns that are generated based on macro cell identification information, and that are the same as the interleaving patterns used in the macro base station.

Here, the macro cell identification information is identification information of the macro cell M, and is, for example, the cell ID (also referred to as a "physical cell ID (PCI)") of the macro cell M. Also, small cell identification information (to be described later) is identification information of the small cell S, and is, for example, the cell ID (also referred to as a "PCI") of the small cell S. Note that, as long as the macro cell identification information and the small cell identification information are information specific to each cell, which includes the macro cell M and the small cell S, these are not limited to cell IDs.

Also, although downlink control signals include the physical downlink control channel (PDCCH) signal, which transmits downlink control information (DCI), the physical control format indicator channel (PCFICH) signal, which transmits control format indicators (CFIs), or the physical hybrid ARQ indicator channel (PHICH) signal, which transmits delivery acknowledgment information (ACK/NACK/DTX) of the physical uplink shared data channel (PUSCH) signal, these are by no means limiting. For example, the downlink control signals may include the enhanced physical downlink control channel (enhanced PDCCH, ePDCCH, E-PDCCH) signal, which is frequency-division-multiplexed with the physical downlink shared data channel (PDSCH) signal and transmits DCI.

Note that the radio resource units, to which DCI to be transmitted by the PDCCH is allocated, are control channel elements (CCEs). Also, the radio resource units, to which DCI to be transmitted by the enhanced PDCCH is allocated, are enhanced control channel elements (eCCEs). Also, the radio resource units, to which CFIs to be transmitted by the PCFICH and delivery acknowledgment information to be transmitted by the PHICH are allocated, are resource element groups (REGs). Note that an REG is formed with four resource elements (REs), and a CCE is formed with nine REGs. eCCEs may be formed with a plurality of enhanced resource element groups (eREGs), or may be formed by dividing a physical resource block (PRB) pair using at least one of frequency division, code division and time division.

Also, interleaving means changing the order of resources in accordance with predetermined patterns, and here, means moving the resources where downlink control signals are allocated, at least in the frequency direction, and may include cyclic shifts and frequency offsets. Also, here, the interleaving patterns means patterns of moving the resources where downlink control signals are allocated, in the frequency direction, and may include shift patterns to be used for cyclic shifts and offset values to be used for frequency offsets.

Now, an interference reduction method according to the present embodiment will be described. Although an example to use the PDCCH signal will be described below, this is by no means limiting. The interference reduction method is applicable to cases where downlink control signals are the PCFICH signal, the PHICH signal, the enhanced PDCCH signal and so on, by changing radio resource units to allocate the downlink control signals to, from CCEs to REGs and eCCEs. Also, assume that the following interference reduction method is applied to the radio communication system shown in FIG. 7.

Figure 3:
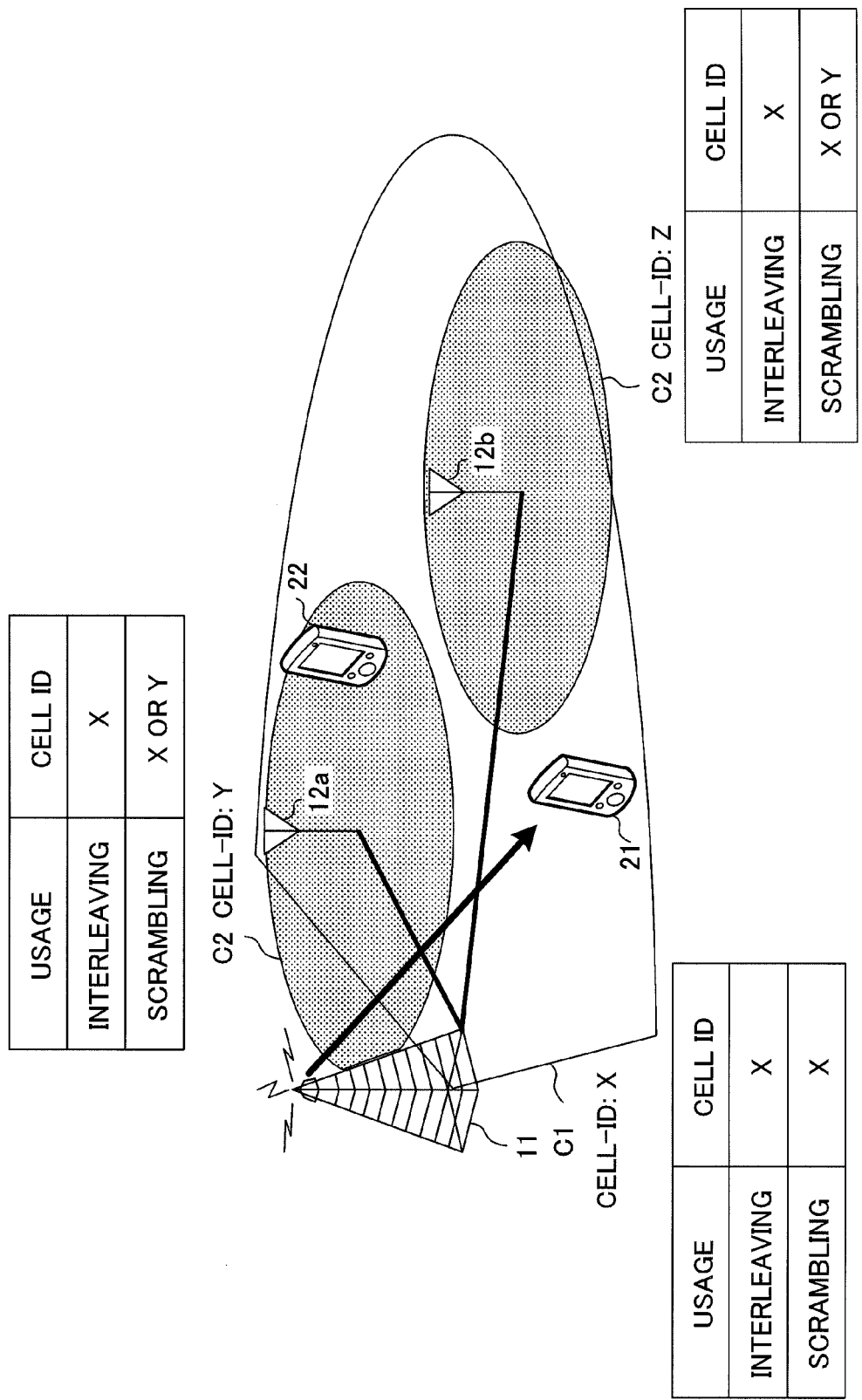
FIG. 3 is a conceptual diagram of an interference reduction method according to the present embodiment.

FIG. 3 is a conceptual diagram to show an interference reduction method according to the present embodiment. In FIG. 3, a macro base station 11 transmits the cell ID "X" of a macro cell C1 to a user terminal 21 that connects to the macro base station 11. The macro base station 11 generates an interleaving pattern (including a shift pattern) that is specific to the macro cell C1 using, for example, above equation 2, based on the cell ID "X." The macro base station 11 interleaves (which includes applying a cyclic shift) the PDCCH signal for a user terminal 22 using the generated interleaving pattern and transmits the signal.

Meanwhile, in FIG. 3, a small base station 12a transmits the cell ID "X" of the macro cell C1 to the user terminal 22 that connects to the small base station 12a. The small base station 12a generates the same interleaving pattern (including the shift pattern) as the interleaving pattern to be used in the macro base station 11, using, for example, above equation 2, based on the cell ID "X" of the macro cell C1. The small base station 12 interleaves (which includes applying a cyclic shift) the PDCCH signal for the user terminal 22 using the generated interleaving patterns and transmits the signal.

Here, the small base station 12a may transmit the cell ID "X" of the macro cell C1, which is different from the subject cell (the small cell), using higher layer signaling such as RRC signaling, or may transmit the cell ID "X" using broadcast information such as MIBs (Master Information Blocks) or SIBs (System Information Blocks), to the user terminal 22. Note that the cell ID "X" of the macro cell C1 may be stored in the small base station 12a in advance, or may be reported from the macro base station 11 to the small base station 12a.

Also, in FIG. 3, the PDCCH signal for the user terminal 22 may be scrambled using either the same scrambling sequence as the scrambling sequence used in the macro base station 11 or a scrambling sequence that is specific to the small cell C2. The same scrambling sequence as the scrambling sequence used in the macro base station 11 is generated using, for example, above equation 1, based on the cell ID "X" of the macro cell C1. Meanwhile, the scrambling sequence that is specific to the small cell C2 is generated using, for example, above equation 1, based on the cell ID "Y" of the small cell C2.

Figure 4:
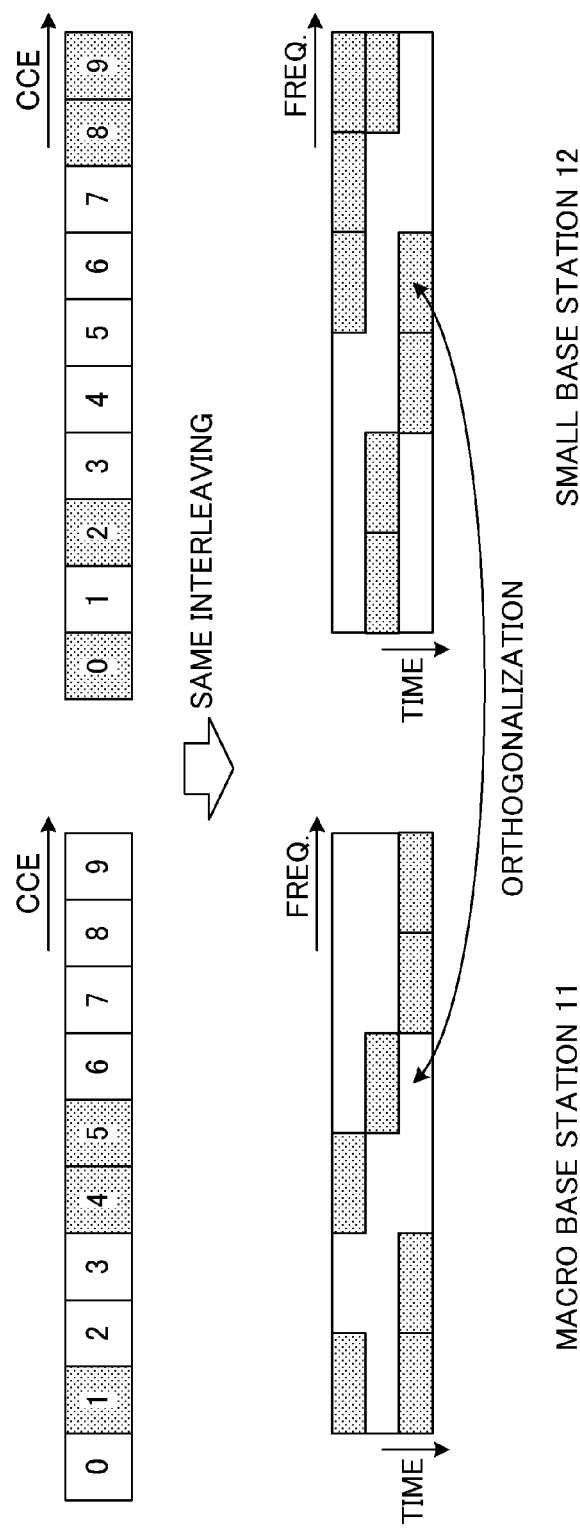
FIG. 4 is a diagram to show an example of an interference reduction method according to the present embodiment.

An example of an interference reduction method according to the present embodiment will be described in detail with reference to FIG. 4. FIG. 4 is a diagram to show an example of an interference reduction method according to the present embodiment. Note that the small base station 12 of FIG. 4 may include the small base stations 12a and 12b of FIG. 3.

As shown in FIG. 4, the small base station 12 allocates the PDCCH signal for the user terminal 22 to CCEs having different index numbers from those of the PDCCH signal transmitted from the macro base station 11. Index number information that represents the index numbers of the CCEs used in the macro base station 11 is reported from the macro base station 11 to the small base station 12. The small base station 12 allocates the PDCCH signal to CCEs having different index numbers from those of the macro base station 11.

For example, in FIG. 4, the macro base station 11 allocates the PDCCH signal for the user terminal 21 to the CCEs having the index numbers "1," "4" and "5." Meanwhile, the small base station 12 allocates the PDCCH signal for the user terminal 22 to the CCEs having the index numbers "0," "2," "8" and "9," which are different from those of the macro base station 11.

Also, in FIG. 4, the small base station 12 generates an interleaving pattern using, for example, above equation 2, based on the cell ID "X" of the macro cell C1. This interleaving pattern is generated based on the cell ID "X" of the macro cell C1, so that this interleaving pattern is the same as the interleaving pattern that is used in the macro base station 11.

Using this interleaving pattern, the small base station 12 interleaves the PDCCH signal, to which CCEs having different index numbers from those of the macro base station 11 are allocated. With this interleaving, as shown in FIG. 4, the PDCCH signal of the small base station 12 is mapped to different radio resources (for example, resource elements) from those of the PDCCH signal in the macro base station 11.

In this way, in FIG. 4, the small base station 12 allocates the PDCCH signal to CCEs having different index numbers from those of the macro base station 11, and interleaves the PDCCH signal using the same interleaving pattern as that of the macro base station 11. Consequently, since the radio resources (for example, resource elements) where the PDCCH signal is placed can be made different between the macro base station 11 and the small base station 12, it is possible to realize orthogonalization. Also, it is possible to carry out interference coordination between the PDCCH signals of the small base station and the macro base station 11 on the level of CCEs.

Note that, in the case shown in FIG. 4, the small base station 12 may scramble the PDCCH signal for the user terminal 22 using either the same scrambling sequence as in the macro base station 11 or a scrambling sequence that is specific to the subject station (the small base station).

Figure 5:
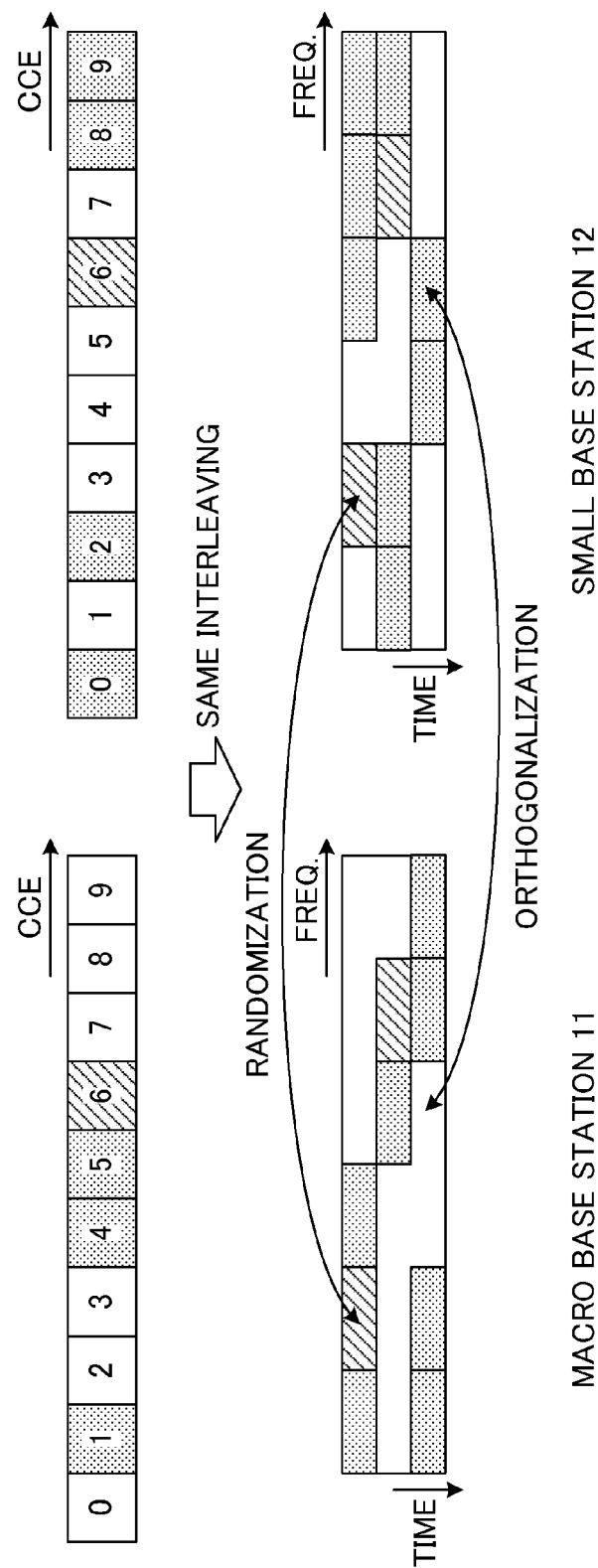
FIG. 5 is a diagram to show another example of an interference reduction method according to the present embodiment.

Another example of an interference reduction method according to the present invention will be described with reference to FIG. 5. FIG. 5 is a diagram to show another example of an interference reduction method according to the present embodiment.

In FIG. 4, the small base station 12 allocates the PDCCH signal for the user terminal 22 only to CCEs having different index numbers from those of the macro base station 11. Meanwhile, as shown in FIG. 5, the small base station 12 may allocate the PDCCH signal for the user terminal 22 not only to CCEs having different index numbers from those of the macro base station 11, but also to the CCEs having the same index numbers as those of the macro base station 11.

For example, in FIG. 5, the macro base station 11 allocates the PDCCH signal for the user terminal 21 to the CCE having the index number "6." Also, the small base station 12 allocates the PDCCH signal for the user terminal 22 to the CCE having the index number "6," which is the same index number as that of the CCE, to which the PDCCH signal from the macro base station 11 is allocated.

Also, the small base station 12 interleaves the PDCCH signal, to which the CCE having the index number "6" is allocated, using the same interleaving pattern as the interleaving pattern that is used in the macro base station 11. By this means, as shown in FIG. 5, the PDCCH signal is allocated to the same CCE, in the macro base station 11 and in the small base station 12, and mapped to the same radio resources (for example, resource elements).

So, the small base station 12 scrambles the PDCCH signal for the user terminal 22 using a scrambling sequence that is generated based on the cell ID of the subject cell and that is specific to the subject cell. By this means, the PDCCH signals in the macro base station 11 and the small base station 12 are scrambled using different scrambling sequences. As a result of this, even if the PDCCH signals of the macro base station 11 and the small base station 12 cannot be orthogonalized, it is still possible to randomize interference.

Figure 6:
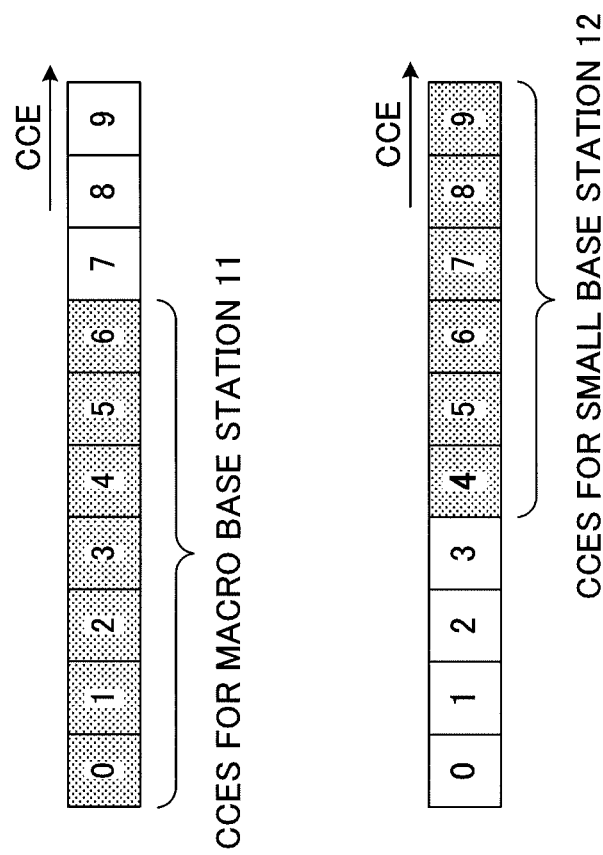
FIG. 6 is a diagram to show yet another example of an interference reduction method according to the present embodiment.

Yet another example of an interference reduction method according to the present embodiment will be described with reference to FIG. 6. FIG. 6 is a diagram to show yet another example of an interference reduction method according to the present embodiment.

In FIG. 4 and FIG. 5, the small base station 12 allocates the PDCCH to CCEs having different index numbers from those of the macro base station 11, based on index number information reported from the macro base station 11. Meanwhile, as shown in FIG. 6, the CCEs to which the PDCCH can be allocated in the small base station 12 and the CCEs to which the PDCCH can be allocated in the macro base station 11 may be determined in advance so that at least part of the index numbers are different.

In FIG. 6, the CCEs of the index numbers "0" to "6" are determined as CCEs for the macro base station 11. Meanwhile, the CCEs of the index numbers "4" to "9" are determined as CCEs for the small base station 12. Note that in FIG. 6, although the CCEs of the index numbers "4" to "6" are determined for the macro base station 11 and the small base station 12 in an overlapping manner, CCEs that are determined in an overlapping manner may not exist as well.

In this way, by determining CCEs that can be used in both the macro base station 11 and the small base station 12 in advance, it is possible to reduce the amount of signaling between the macro base station 11 and the small base station 12.

Now, a configuration of a radio communication system according to the present embodiment will be described.

Figure 7:
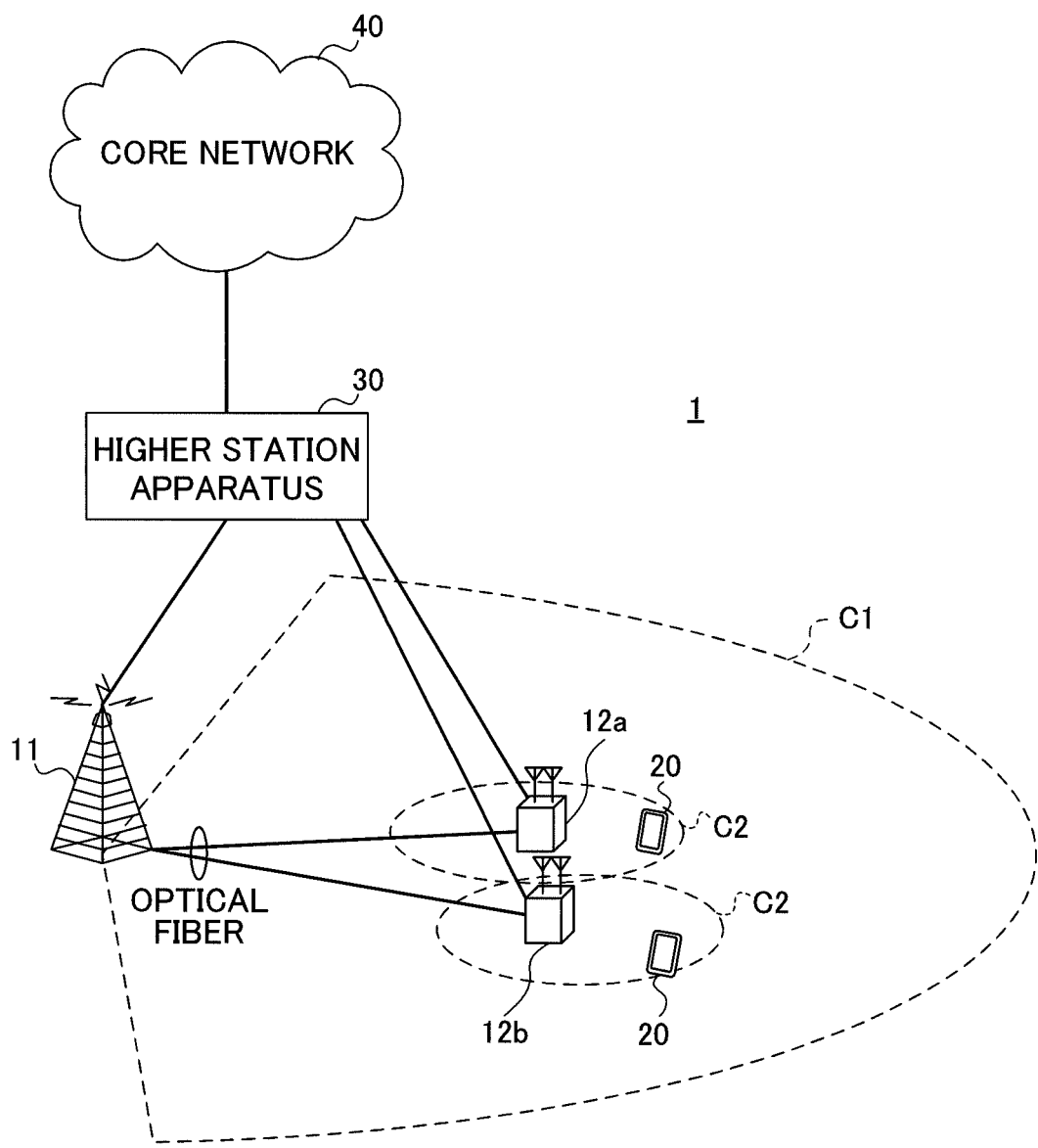
FIG. 7 is a schematic diagram to show an example of a radio communication system according to the present embodiment.

FIG. 7 is a schematic configuration diagram of a radio communication system according to the present embodiment. Note that the radio communication system shown in FIG. 7 is a system to accommodate, for example, the LTE system or its successor system. In this radio communication system, carrier aggregation to group a plurality of fundamental frequency blocks into one, where the system band of the LTE system is one unit, is used. Also, this radio communication system may be referred to as "IMT-Advanced" or may be referred to as "4G."

As shown in FIG. 7, a radio communication system 1 has a radio base station 11 forming a macro cell C1 and radio base stations 12a and 12b forming small cells C2 that are narrower than the macro cell C1. As shown in FIG. 7, each small cell C2 is formed so that the small cell C2 overlaps with the macro cell C1 at least in part. The radio base station 11 and the radio base stations 12 communicate with user terminals 20 using frequency bands that at least partly overlap.

With the present embodiment, the radio base station 11 and the small base stations 12 (including 12a and 12b) will be referred to as a "macro base station 11" and "small base stations 12," respectively. Note that the macro base station 11 may be referred to as an "eNodeB," a "radio base station apparatus," a "transmission point" and so on. Also the small base stations 12 may be referred to as "pico base stations," "femto base stations," "Home to eNodeBs," "RRHs (Remote Radio Heads)," "micro base stations," "transmission points," and so on.

Also, the user terminals 20 are terminals supporting each communication scheme such as LTE and LTE-A, and may be not only mobile communication terminals but may also be fixed communication terminals as well. With the present embodiment, although user terminals 20 may be referred to as "user terminals 21" when connected to the macro base station 11 and may be referred to as "user terminals 22" when connected to the small base stations 12, both have the same configurations.

As shown in FIG. 7, the macro base station 11 and each small base station 12 are each connected to a higher station apparatus 30, and connected to a core network 40 via the higher station apparatus 30. Note that the higher station apparatus 30 may be, for example, an access gateway apparatus, a radio network controller (RNC), a mobility management entity (MME) and so on, but is by no means limited to these. Also, each small base station 12 may be connected with the higher station apparatus via the macro base station 11.

Also, the macro base station 11 and each small base station 12 are connected using, for example, an X2 interface. Although an example in which the macro base station 11 and each small base station 12 are connected using wire connection such as optical fiber will be described below, they may be connected using wireless connection.

In the radio communication system 1, as radio access schemes, OFDMA (Orthogonal Frequency Division Multiple Access) is applied to the downlink, and SC-FDMA (Single-Carrier Frequency-Division Multiple Access) is applied to the uplink. OFDMA is a multi-carrier transmission scheme to perform communication by dividing a frequency band into a plurality of narrow frequency bands (subcarriers) and mapping data to each subcarrier. SC-FDMA is a single carrier transmission scheme to reduce interference between terminals by dividing, per terminal, the system band into bands formed with one or continuous resource blocks, and allowing a plurality of terminals to use mutually different bands.

Signals to be used in the radio communication system shown in FIG. 7 will be described. Downlink signals include downlink data signals and downlink control signals. The downlink data signals include, for example, the PDSCH signal that transmits user data and higher layer control information. Also, the downlink control signals include, for example, the PDCCH signal, which transmits downlink control information (DCI), the PCFICH signal, which transmits control format indicators (CFIs), the PHICH signal, which transmits delivery acknowledgment information (ACK/NACK/DTX), and the enhanced PDCCH signal, which transmits downlink control information (DCI) and which is frequency-division-multiplexed with the PDSCH signal.

Similarly, uplink signals include uplink data signals and uplink control signals. The uplink data signals include, for example, the PUSCH (Physical Uplink Shared CHannel) signal to transmit user data and uplink layer control information. Also, the uplink control signals include, for example, the PUCCH (Physical Uplink Control CHannel) signal, which transmits downlink channel state information (CSI) and delivery acknowledgment information (ACK/NACK/DTX), and so on.

Figure 8:
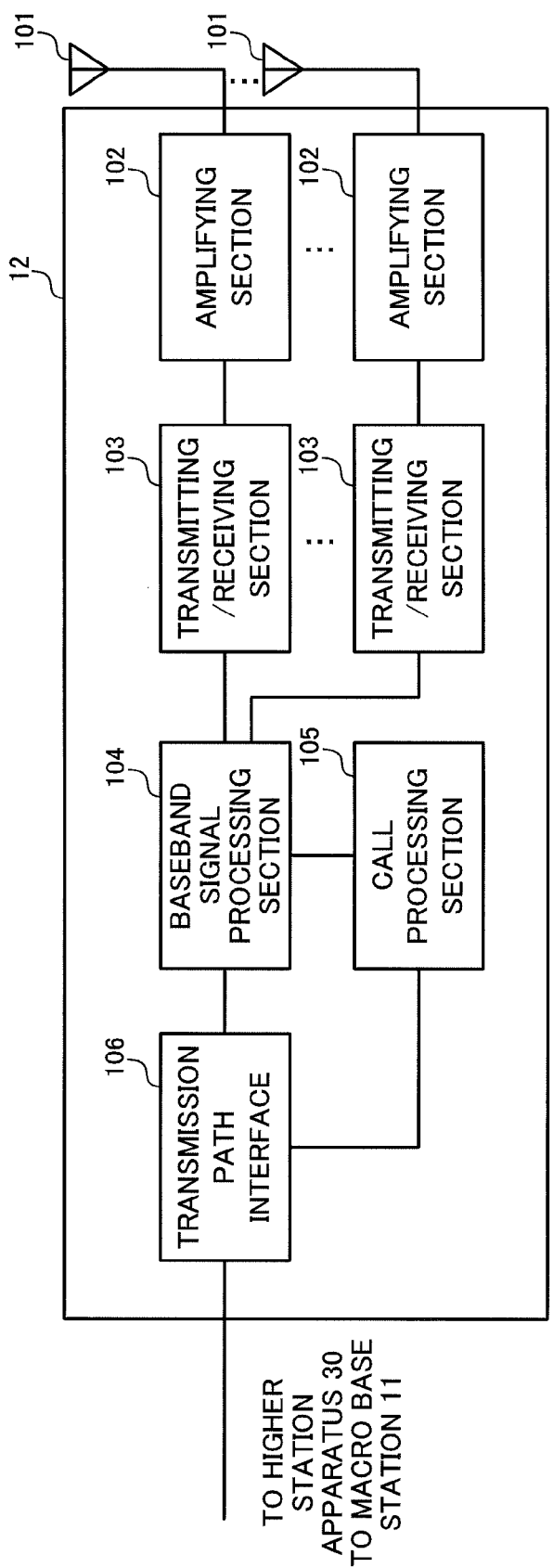
FIG. 8 is a diagram to explain an overall structure of a small base station according to the present embodiment.

FIG. 8 is a diagram of an overall structure of the small base station 12 according to the present embodiment. The small base station 12 includes a plurality of transmitting/receiving antennas 101 for MIMO transmission, amplifying sections 102, transmitting/receiving sections 103 (transmitting sections), a baseband signal processing section 104, a call processing section 105 and a transmission path interface 106.

Downlink data signals are input from the higher station apparatus 30 into the baseband signal processing section 104, via the transmission path interface 106.

In the baseband signal processing section 104, a PDCP layer process, division and coupling of user data, RLC (Radio Link Control) layer transmission processes such as an RLC retransmission control transmission process, MAC (Medium Access Control) retransmission control, including, for example, an HARQ transmission process, scheduling, transport format selection, channel coding, an inverse fast Fourier transform (IFFT) process, and a precoding process are performed, and the result is transferred to each transmitting/receiving section 103. Also, the downlink control channel signals are also subjected to transmission processes such as channel coding and an inverse fast Fourier transform, and are transferred to each transmitting/receiving section 103.

Also, the baseband signal processing section 104 reports, to the user terminals 20, broadcast information for allowing communication in the cell, through a broadcast channel. This broadcast information includes, for example, the cell ID of the subject cell, and system bandwidth on the uplink or the downlink and so on.

Each transmitting/receiving section 103 converts baseband signals, which are precoded and output from the baseband signal processing section 104 on a per antenna basis, into a radio frequency band. The amplifying sections 102 amplify the radio frequency signals having been subjected to frequency conversion, and output the results through the transmitting/receiving antennas 101.

Meanwhile, as for the uplink signals, the radio frequency signals that are received in each transmitting/receiving antennas 101 are amplified in the amplifying sections 102, converted into baseband signals through frequency conversion in each transmitting/receiving section 103, and input in the baseband signal processing section 104.

In the baseband signal processing section 104, the uplink signals included in the input baseband signals are subjected to an FFT process, an IDFT process, error correction decoding, a MAC retransmission control receiving process, and RLC layer and PDCP layer receiving processes, and the result is transferred to the higher station apparatus 30 via the transmission path interface 106. The call processing section 105 performs call processing such as setting up and releasing communication channels, manages the state of the small base station 12 and manages the radio resources.

Also, control information reported from the macro base station 11 to the small base station 12 is input in the baseband signal processing section 104 via the transmission path interface 106. The control information reported from the macro base station 11 includes, for example, the cell ID of the macro cell C1 and index number information (to be described later).

Figure 9:
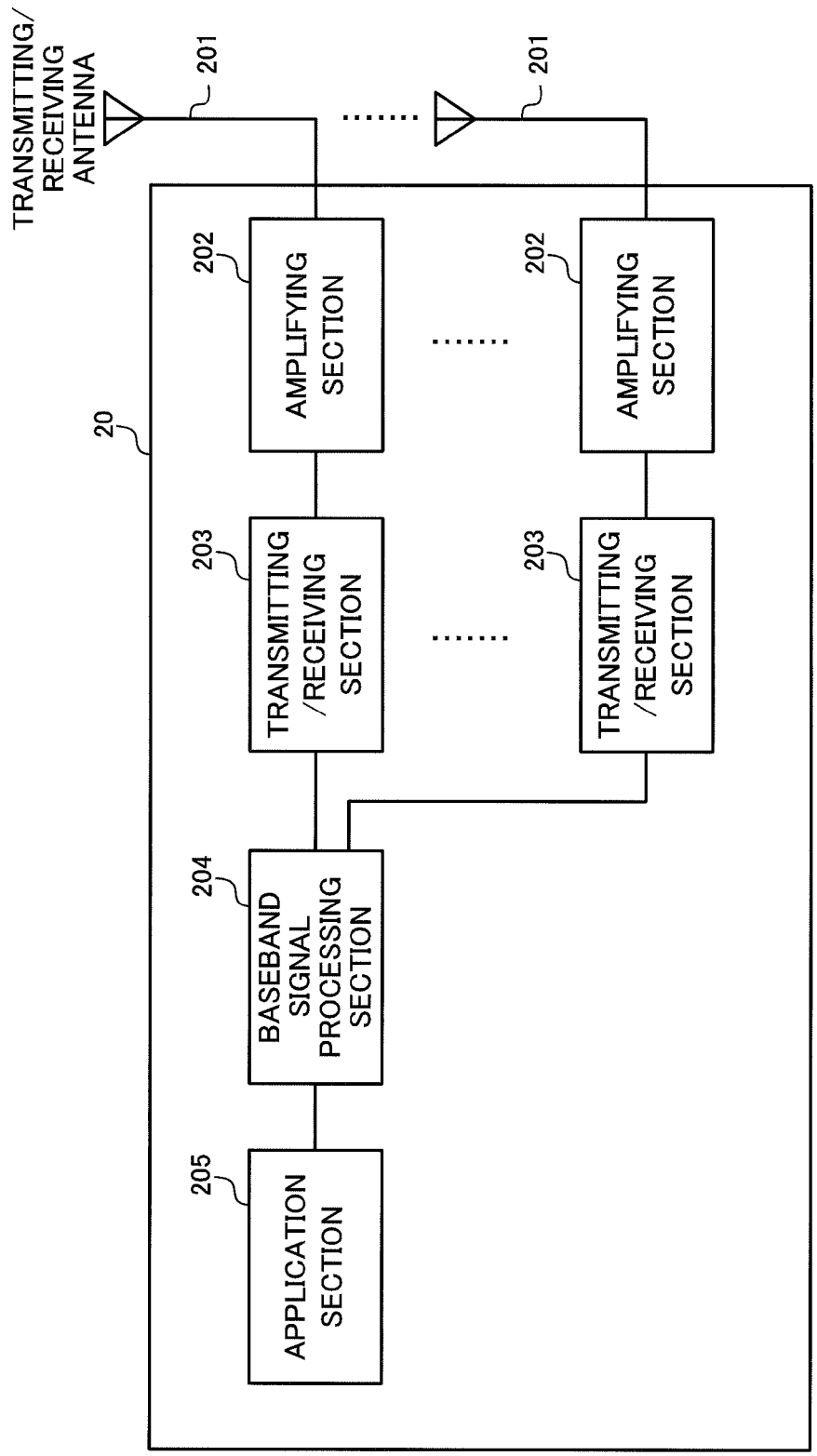
FIG. 9 is a diagram to explain an overall structure of a user terminal according to the present embodiment.

FIG. 9 is a diagram of an overall structure of the user terminal 20 according to the present embodiment. The user terminal 20 has a plurality of transmitting/receiving antennas 201 for MIMO transmission, amplifying sections 202, transmitting/receiving sections (receiving sections) 203, a baseband signal processing section 204, and an application section 205.

As for the downlink data signals, radio frequency signals that are received in the plurality of transmitting/receiving antennas 201 are each amplified in the amplifying sections 202, and subjected to frequency conversion and converted into baseband signals in the transmitting/receiving sections 203. These baseband signals are subjected to an FFT process, error correction decoding, retransmission control receiving process and so on in the baseband signal processing section 204. The user data included in these downlink data signals is transferred to the application section 205. The application section 205 performs processes related to higher layers above the physical layer and the MAC layer, and so on. Also, the broadcast information included in the downlink data signals is transferred to the application section 205.

Meanwhile, the uplink data signals are input from the application section 205 to the baseband signal processing section 204. The baseband signal processing section 204 performs a retransmission control (H-ARQ (Hybrid ARQ)) transmission process, channel coding, precoding, a DFT process, an IFFT process and so on, and the result is transferred to each transmitting/receiving section 203. The transmitting/receiving sections 203 convert the baseband signals that are output from the baseband signal processing section 204 into a radio frequency band. After that, the amplifying sections 202 amplify the radio frequency signals having been subjected to frequency conversion, and transmit the result from the transmitting/receiving antennas 201.

Figure 10:
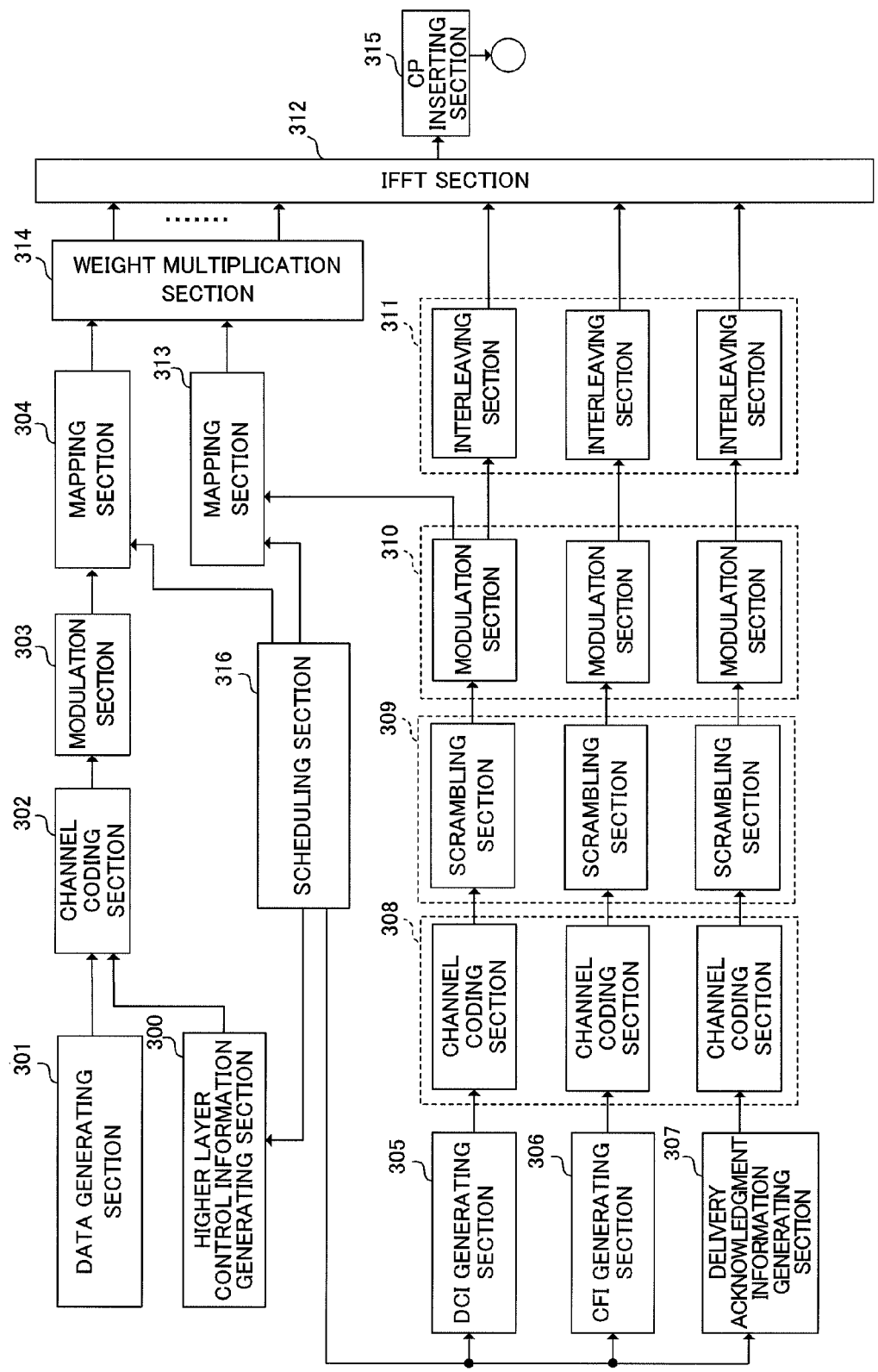
FIG. 10 is a functional configuration diagram to show a baseband processing section of a small base station according to the present embodiment, and part of higher layers.

FIG. 10 is a functional configuration diagram of the baseband signal processing section 104 provided in the small base station 12 according to the present embodiment, and part of higher layers. Note that, although FIG. 10 primarily shows downlink (transmitting) functional configurations, the small base station 12 may have uplink (receiving) functional configurations as well.

As shown in FIG. 10, the small base station 12 has a higher layer control information generating section 300, a data generating section 301, a channel coding section 302, a modulation section 303, a mapping section 304, a downlink control information (DCI) generating section 305, a control format indicator (CFI) generating section 306, a delivery acknowledgment information generating section 307, channel coding sections 308, scrambling sections 309, modulation sections 310, interleaving sections 311, an IFFT section 312, a mapping section 313, a weight multiplication section 314, a CP inserting section 315 and a scheduling section 316.

The higher layer control information generating section 300 generates higher layer control information on a per user terminal 20 basis. Also, the higher layer control information is control information that is sent by higher layer signaling (for example, RRC signaling), and includes, for example, the cell ID of the macro cell C1 reported from the macro base station 11. The data generating section 301 generates downlink user data per user terminal 20.

The downlink user data that is generated in the data generating section 301 and the higher layer control information that is generated in the higher layer control information generating section 300 are input in the channel coding section 302 as the PDSCH signal. The channel coding section 302 performs channel coding of the PDSCH signal for each user terminal 20 in accordance with the coding rate determined based on feedback information from each user terminal 20. The modulation section 303 modulates the PDSCH signal having been subjected to channel coding, in accordance with the modulation scheme determined based on feedback information from each user terminal 20. The mapping section 304 maps the modulated PDSCH signal to radio resources (for example, resource elements) in accordance with commands from the scheduling section 316.

The DCI generating section 305 generates downlink control information (DCI) based on the scheduling information from the scheduling section 316. The DCI includes cell-specific shared control information and UE-specific control information. The UE-specific control information includes PDSCH allocation information (DL assignment), PUSCH allocation information (UL grants) and so on.

Also, the DCI generating section 305 can generate DCI to be transmitted by the PDCCH on a per control channel element (CCE) basis and DCI to be transmitted by the enhanced PDCCH on a per enhanced control channel element (eCCE) basis. Also, the sizes of CCEs and eCCEs (the number of REs) may be different or may be the same.

Also, as shown in FIG. 4, the DCI generating section 305 allocates the generated DCI to CCEs having different index numbers from those of the macro base station 11. Furthermore, as shown in FIG. 5, the DCI generating section 305 may allocate the DCI to CCEs having the same index numbers as in the macro base station 11. The DCI allocated to CCEs is input in the channel coding sections 308 as the PDCCH signal. Similarly, the DCI to be transmitted by the enhanced PDCCH is allocated to eCCEs, and input in the channel coding sections 308 as the enhanced PDCCH signal. The DCI generating section 305 constitutes the allocation section of the present invention.

Note that the index numbers of the CCEs (index number information) used in the macro base station 11 may be reported from the macro base station 11 to the DCI generating section 305. Alternatively, CCEs that can be used in the small base station 12 and CCEs that can be used in the macro base station 11 may be determined in advance so that at least part of the index numbers are different. In the latter case, it is possible to reduce the amount of control that is required between the macro base station 11 and the small base station 12. Also, the same will apply to the index numbers of eCCEs.

The CFI generating section 306 generates control format indicators (CFIs) to be transmitted by the PCFICH based on scheduling information from the scheduling section 316. The CFI generating section 306 can generate CFIs on a per resource element group (REG) basis.

Also, the CFI generating section 306 allocates the CFIs to REGs having different index numbers from those of the macro base station 11. Also, the CFI generating section 306 may allocate the CFIs to REGs having the same index numbers as in the macro base station 11. The CFIs that are allocated to the REGs are input in the channel coding sections 308. The CFI generating section 306 constitutes the allocation section of the present invention.

The delivery acknowledgment information generating section 307 generates delivery acknowledgment information (ACK/NACK/DTX) to be transmitted by the PHICH based on the scheduling information from the scheduling section 316. The delivery acknowledgment information generating section 307 can generate delivery acknowledgment information on a per resource element group (REG) basis.

Also, the delivery acknowledgment information generating section 307 allocates delivery acknowledgment information to REGs having different index numbers from those of the macro base station 11. Also, the delivery acknowledgment information generating section 307 may allocate delivery acknowledgment information to REGs having the same index numbers as in the macro base station 11. The delivery acknowledgment information allocated to the REGs is input in the channel coding sections 308 as the PHICH signal. The delivery acknowledgment information generating section 307 constitutes the allocation section of the present invention.

Note that the index numbers (index number information) of the REGs used in the macro base station 11 may be reported from the macro base station 11 to the CFI generating section 306 and the delivery acknowledgment information generating section 307, or may be determined in advance.

The channel coding sections 308 perform channel coding of the input downlink signals in a predetermined coding rate. To be more specific, the channel coding sections 308 perform channel coding of the PDCCH signal input from the DCI generating section 305, the enhanced PDCCH signal input from the CFI generating section 306, the PCFICH signal input from the CFI generating section 306, and the PHICH signal input from the delivery acknowledgment information generating section 307.

The scrambling sections 309 perform channel coding of the downlink control signals having been subjected to channel coding using predetermined scrambling sequences. To be more specific, the scrambling sections 309 scrambles the PDCCH signal, the enhanced PDCCH signal, the PCFICH signal, and the PHICH signal, that have been subjected to channel coding, using the same scrambling sequence as that used in the macro base station 11 or using a scrambling sequence that is specific to the subject cell.

Here, the same scrambling sequence as the scrambling sequence used in the macro base station 11 is generated based on the cell ID of the macro cell C1 (macro cell identification information). Meanwhile, the scrambling sequence that is specific to the subject cell is generated based on the cell ID (small cell identification information) of the subject cell (small cell C2).

When a scrambling sequence that is specific to the subject cell is used, it is possible to randomize interference between downlink control signals in the macro base station 11 and the small base station 12. Consequently, this method is effective when CCEs having the same index numbers as in the macro base station 11 are allocated to the PDCCH signal. Similarly, this method is effective when REGs having the same index numbers as in the macro base station 11 are allocated to the PCFICH signal and the PHICH signal. Also, this method is also effective when eCCEs having the same index numbers as in the macro base station 11 are allocated to the enhanced PDCCH signal.

The modulation sections 310 modulate the scrambled downlink control signals in a predetermined modulation scheme. To be more specific, the modulation sections 310 modulate the scrambled PDCCH signal, the enhanced PDCCH signal, the PCFICH signal, which have been scrambled, and the PHICH signal. Note that the modulation sections 310 output the PDCCH signal, the PCFICH signal and the PHICH signal that have been modulated, to the interleaving sections 311. Meanwhile, the modulation sections 310 output the modulated enhanced PDCCH signal to the mapping section 313.

The interleaving sections 311 interleave the modulated downlink control signals using the same interleaving pattern as the interleaving pattern that is used in the macro base station 11. The interleaving pattern is generated based on the cell ID of the macro cell C1 (macro cell identification information).

Note that, as described above, the interleaving pattern may be a shift pattern of a cyclic shift and an offset value of a frequency offset. Consequently, the interleaving sections 311 can apply a cyclic shift to the modulated PDCCH signal using the same shift pattern as the shift pattern that is used in the macro base station 11. Also, the interleaving sections 311 can move the PCFICH signal and the PHICH signal, which have been modulated, in the frequency direction using the same offset values as the frequency offset values used in the macro base station 11.

In the DCI generating section 305, when the PDCCH signal is allocated to CCEs having different index numbers from those of the macro base station 11, by the interleaving sections 311, this PDCCH signal is mapped to different radio resources (for example, resource elements) from those of the PDCCH signal in the macro base station 11. In this case, the PDCCH signals in the macro base station 11 and the small base station 12 are orthogonalized, so that interference is reduced.

Similarly, in the CFI generating section 306 and the delivery acknowledgment information generating section 307, when the PCFICH signal and the PHICH signal are allocated to REGs having different index numbers from those of the macro base station 11, by the interleaving sections 311, these PCFICH signals and PHICH signals are mapped to different radio resources (for example, resource elements) from those of the macro base station 11. In this case, the PCFICH signals and the PHICH signals in the macro base station 11 and the small base station 12 are orthogonalized, so that interference is reduced.

Meanwhile, in the DCI generating section 305, when the PDCCH signal is allocated to CCEs having the same index numbers as in the macro base station 11, by the interleaving sections 311, this PDCCH signal is mapped to the same radio resources as the PDCCH signal in the macro base station 11. In this case, it is preferable to randomize interference by scrambling the PDCCH signal using a cell-specific scrambling sequence in the scrambling sections 309.

Similarly, in the CFI generating section 306 and the delivery acknowledgment information generating section 307, when the PCFICH signal and the PHICH signal are allocated to REGs having the same index numbers as in the macro base station 11, by the interleaving sections 311, these PCFICH signal and PHICH signal are mapped to the same radio resources (for example, resource elements) as in the macro base station 11. In this case, it is preferable to randomize interference by scrambling the PCFICH signal and the PHICH signal using cell-specific scrambling sequences in the scrambling sections 309.

The mapping section 313 maps the enhanced PDCCH signal to the predetermined radio resources (for example, resource elements). At this time, the mapping section 313 can interleave the enhanced PDCCH signal using the same interleaving pattern as the interleaving pattern that is used in the macro base station 11, based on the cell ID of the macro cell C1 (macro cell identification information). By this means, it is possible to allocate the enhanced PDCCH signal to different radio resources from those in the macro base station 11.

The enhanced PDCCH signal mapped in the mapping section 313 is input in the weight multiplication section 314 with the PDSCH signal mapped in the mapping section 304. The weight multiplication section 314 multiplies the PDSCH signal, the enhanced PDCCH signal, and the demodulated reference signal by user terminal 20-specific precoding weights, and pre-encodes them.

The IFFT section 312 performs an inverse fast Fourier transform process on the input signals from the interleaving sections 311 and the weight multiplication section 314, and converts the frequency domain signals into time domain signals. Cyclic prefixes (CPs) to function as guard intervals are inserted in the output signals from the IFFT section 312 by the CP inserting section 315, and the signals are output to the transmitting/receiving sections 103.

The scheduling section 316 schedules the PDSCH signal and the enhanced PDCCH signal and generates scheduling information. The scheduling section 316 outputs the generated scheduling information to the DCI generating section 305, the CFI generating section 306, and the delivery acknowledgment information generating section 307.

Figure 11:
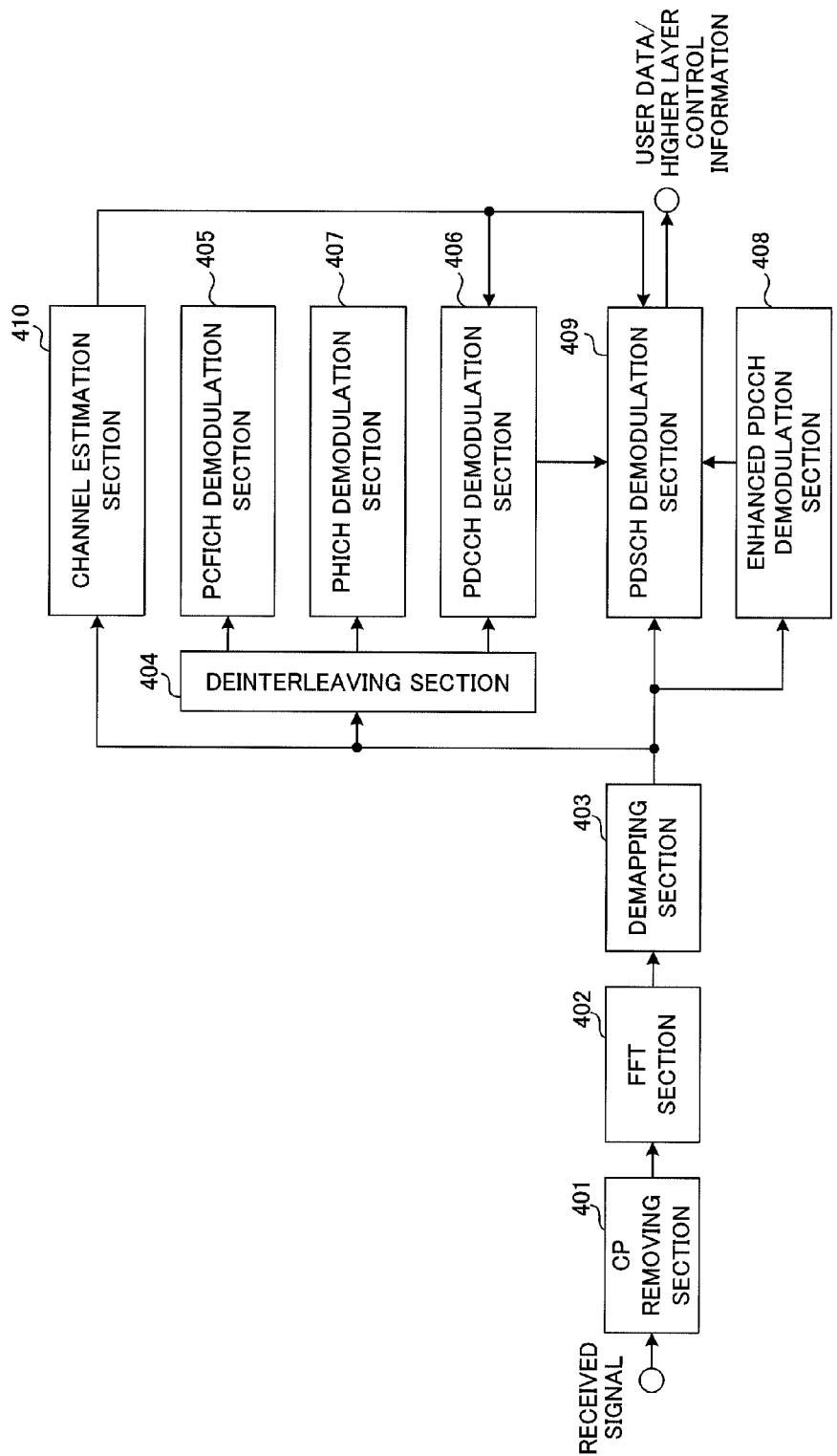
FIG. 11 is a functional configuration diagram of a baseband processing section of a user terminal according to the present embodiment.

FIG. 11 is a functional configuration diagram of the baseband signal processing section 104 provided in the user terminal 20. Note that, although FIG. 11 primarily shows downlink (receiving) functional configurations, the user terminal 20 may have uplink (transmitting) functional configurations as well. Also, although a case in which the user terminal 20 is connected to the small base station 12 will be mainly described below, the user terminal 20 may be connected to the macro base station 11 as well.

The user terminal 20 has a CP removing section 401, an FFT section 402, a demapping section 403, a deinterleaving section 404, a PCFICH demodulation section 405, a PDCCH demodulation section 406, a PHICH demodulation section 407, an enhanced PDCCH demodulation section 408, a PDSCH demodulation section 409, and a channel estimation section 410.

Downlink signals received from the small base station 12 have the cyclic prefixes (CPs) removed in the CP removing section 401. The downlink signals, from which the CPs have been removed, are input in the FFT section 402. The FFT section 402 performs a fast Fourier transform (FFT) on the downlink signals, converts the time domain signals into frequency domain signals, and inputs these signals in the demapping section 403. The demapping section 403 demaps the downlink signals. Note that the demapping process by the demapping section 403 is performed based on higher layer control information that is received as input from the application section 205.

The deinterleaving section 404 deinterleaved the demapped downlink control signals using the same interleaving pattern as the interleaving pattern that is used in the macro base station 11. This interleaving pattern is generated based on the cell ID of the macro cell C1 (macro cell identification information) reported from the small base station 12. Note that the cell ID of the macro cell C1 may be reported by either higher layer signaling or the broadcast signal from the small base station 12.

Also, the deinterleaving section 404 outputs the PCFICH signal, the PDCCH signal and the PHICH signal that have been deinterleaved, to the PCFICH demodulation section 405, the PDCCH demodulation section 406, and the PHICH demodulation section 407, respectively.

The PCFICH demodulation section 405 performs demodulation, descrambling and channel decoding of the PCFICH signal output from the deinterleaving section 404. To be more specific, the PCFICH demodulation section 405 descrambles the PCFICH signal using the same scrambling sequence as in the macro base station 11 or using a scrambling sequence that is specific to the subject cell.

The PDCCH demodulation section 406 performs blind decoding, demodulation, descrambling and channel decoding of the PDCCH signal output from the deinterleaving section 404, based on the channel estimation result in the channel estimation section 410. To be more specific, the PDCCH demodulation section 406 descrambles the PDCCH signal using the same scrambling sequence as in the macro base station 11 or using scrambling sequence that is specific to the subject cell.

The PHICH demodulation section 407 performs demodulation, descrambling and channel decoding of the PHICH signal output from the deinterleaving section 404. To be more specific, the PHICH demodulation section 407 descrambles the PHICH signal using the same scrambling sequence as in the macro base station 11 or using a scrambling sequence that is specific to the subject cell.

The enhanced PDCCH demodulation section 408 performs deinterleaving, blind decoding, demodulation, descrambling and channel decoding of the enhanced PDCCH signal, based on the channel estimation result in the channel estimation section 410. To be more specific, the enhanced PDCCH demodulation section 408 deinterleaves the demapped enhanced PDCCH signal using the same interleaving pattern as the interleaving pattern that is used in the macro base station 11. Also, the enhanced PDCCH demodulation section 408 descrambles the PDCCH signal using the same scrambling sequence as in the macro base station 11 or using a scrambling sequence that is specific to the subject cell.

Here, in the PCFICH demodulation section 405, the PDCCH demodulation section 406, the PHICH demodulation section 407 and the enhanced PDCCH demodulation section 408, the same scrambling sequences as in the macro base station 11 are, generated based on the cell ID of the macro cell C1 (macro cell identification information). Also, the scrambling sequences that are specific to the subject cell are generated based on the cell ID of the subject cell (small cell C2) (small cell identification information).

The PDSCH demodulation section 409 performs demodulation and channel decoding of the PDSCH signal and so on output from the demapping section 403, based on the channel estimation result in the channel estimation section 410. To be more specific, the PDSCH demodulation section 409 demodulates the PDSCH signal allocated to the subject terminal based on DCI demodulated in the PDCCH demodulation section 406 or the enhanced PDCCH demodulation section 408, and acquires downlink data (downlink user data and higher layer control information) for the subject terminal.

The channel estimation section 410 performs channel estimation using demodulation reference signals (DM-RSs), measurement reference signals (CRSs and CSI-RSs) and so on. The channel estimation section 410 outputs the result of channel estimation by the measurement reference signals (CRSs and CSI-RSs) to the PDCCH demodulation section 406. Meanwhile, the channel estimation section 410 outputs the result of channel estimation by the demodulation reference signals (DM-RSs) to the PDSCH demodulation section 409.

As has been described above, with the radio communication system 1 according to the present embodiment, the small base station 12 allocates downlink control signals to radio resource units (for example, CCEs) having different index numbers from those in the macro base station 11, and interleaves the downlink control signals using the same interleaving patterns as in the macro base station 11. Consequently, the radio resources (for example, resource elements) where downlink control signals are allocated can be made different between the macro base station 11 and the small base station 12, so that it is possible to realize orthogonalization. Also, it is possible to perform interference coordination between the downlink control signals of the small base station and the macro base station 11 on the level of radio resource allocation units (for example, on the level of CCEs).

Now, although the present invention has been described in detail with reference to the above embodiment, it should be obvious to a person skilled in the art that the present invention is by no means limited to the embodiment described herein. The present invention can be implemented with various corrections and in various modifications, without departing from the spirit and scope of the present invention defined by the recitations of the claims. Consequently, the descriptions herein are provided only for the purpose of explaining examples, and should by no means be construed to limit the present invention in any way.

The disclosure of Japanese Patent Application No. 2012-175148, filed on Aug. 7, 2012, including the specification, drawings and abstract, is incorporated herein by reference in its entirety.

The invention claimed is:

1. An interference reduction method in a small base station having a small cell identification information that forms a small cell that at least partially overlaps with a macro cell that is formed by a macro base station having a macro cell identification information, the interference reduction method comprising the steps of:
   transmitting the macro cell identification information that is used to individually identify the macro cell, to a user terminal in the small cell, wherein the macro cell identification information is transmitted by the small base station;
   allocating a downlink control signal for the user terminal to a radio resource unit having a different index number from that of a second radio resource unit where a downlink control signal to be transmitted from the macro base station is allocated based on, in part, the macro cell identification information; and interleaving the downlink control signal for the user terminal using an interleaving pattern that is generated based on the macro cell identification information and that is the same as an interleaving pattern used in the macro base station, wherein the small cell identification information and the macro cell identification information are different, wherein the downlink control signal for the user terminal is scrambled using a scrambling sequence that is generated based on the macro cell identification information and that is same as a scrambling sequence used in the macro base station.

2. The interference reduction method according to claim 1, wherein the index number of the radio resource unit where the downlink control signal to be transmitted from the macro base station is allocated is reported from the macro base station to the small base station.

3. The interference reduction method according to claim 1, wherein, a radio resource unit where the downlink control signal can be allocated in the small base station and a radio resource unit where the downlink control signal can be allocated in the macro base station are determined in advance so that at least part of index numbers are different.

4. The interference reduction method according to claim 1, wherein:
the downlink control signal is a physical downlink control channel (PDCCH) signal that transmits downlink control information; and
the radio resource unit is a control channel element (CCE).

5. The interference reduction method according to claim 1, wherein:
the downlink control signal is a physical control format indicator channel (PCFICH) signal that transmits a control format indicator, or a physical hybrid ARQ indicator channel (PHICH) signal that transmits delivery acknowledgment information of a physical uplink shared data channel (PUSCH) signal; and
the radio resource units are resource element groups (REGs).

6. The interference reduction method according to claim 1, wherein:
in the transmitting step, the user terminal is accessing the small base station.

7. A radio base station having a small cell identification information that forms a small cell that at least partially overlaps with a macro cell that is formed by a macro base station having a macro cell identification information, the radio base station comprising:
a transmitter that transmits the macro cell identification information that is used to individually identify the macro cell, to a user terminal in the small cell;
a processor that:
allocates a downlink control signal for the user terminal to a radio resource unit having a different index number from that of a second radio resource unit where a downlink control signal to be transmitted from the macro base station is allocated based on, in part, the macro cell identification information; and
interleaves the downlink control signal for the user terminal using an interleaving pattern that is generated based on the macro cell identification information and that is the same as an interleaving pattern used in the macro base station, wherein the small cell identification information and the macro cell identification information are different, wherein the downlink control signal for the user terminal is scrambled using a scrambling sequence that is generated based on the macro cell identification information and that is same as a scrambling sequence used in the macro base station.

8. A user terminal that receives downlink control information from a small base station having a small cell identification information that forms a small cell that at least partially overlaps with a macro cell that is formed by a macro base station having a macro cell identification information, the user terminal comprising:
a receiver that receives the macro cell identification information that is used to individually identify the macro cell, from the small base station, wherein the macro cell identification information is transmitted by the small base station; and
a processor that deinterleaves the downlink control signal using an interleaving pattern that is generated based on the macro cell identification information and that is the same as an interleaving pattern used in the macro base station, wherein the downlink control signal is allocated to a radio resource unit having a different index number from that of a second radio resource unit where a downlink control signal to be transmitted from the macro base station is allocated based on, in part, the macro cell identification information, wherein the small cell identification information and the macro cell identification information are different, and wherein the downlink control signal for the user terminal is scrambled using a scrambling sequence that is generated based on the macro cell identification information and that is same as a scrambling sequence used in the macro base station.

9. A radio communication system that includes a macro base station that forms a macro cell having a macro cell identification information and a small base station having a small cell identification information that forms a small cell that at least partially overlaps with the macro cell, wherein:
the small base station comprises:
a transmitter that transmits the macro cell identification information that is used to individually identify the macro cell, to a user terminal in the small cell, wherein the macro cell identification information is transmitted by the small base station;
a processor that:
allocates a downlink control signal for the user terminal to a second radio resource unit having a different index number from that of a radio resource unit where a downlink control signal to be transmitted from the macro base station is allocated based on, in part, the macro cell identification information, and
interleaves the downlink control signal for the user terminal using an interleaving pattern that is generated based on the macro cell identification information and that is the same as an interleaving pattern used in the macro base station, wherein the small cell identification information and the macro cell identification information are different; and
the user terminal comprises:
a second processor that deinterleaves the downlink control signal using the interleaving pattern,
wherein the downlink control signal for the user terminal is scrambled using a scrambling sequence that is generated based on the macro cell identification information and that is same as a scrambling sequence used in the macro base station.

* * * * *